United States Patent [19]
Philo et al.

[11] Patent Number: 5,520,144
[45] Date of Patent: May 28, 1996

[54] VALVE ACTUATION ASSEMBLY

[75] Inventors: Charles M. Philo, Hudsonville; Ralph L. Clayson, III, Grand Rapids, both of Mich.

[73] Assignee: General Motors Corporation, Detroit, Mich.

[21] Appl. No.: 517,484

[22] Filed: Aug. 21, 1995

[51] Int. Cl.$^6$ .................................. F01L 1/14; F16H 53/06
[52] U.S. Cl. ........................ 123/90.5; 74/569; 74/567; 251/251; 123/90.6
[58] Field of Search ..................... 123/90.16, 90.27, 123/90.48, 90.5, 90.6; 74/569, 567; 251/251

[56] References Cited

U.S. PATENT DOCUMENTS

| | | | |
|---|---|---|---|
| 1,930,261 | 10/1933 | Berry | 123/90.5 |
| 2,107,456 | 2/1938 | Trapp | 123/90.5 |
| 3,277,874 | 10/1966 | Wagner | 123/90 |
| 3,523,459 | 8/1970 | Mowbray | 74/55 |
| 4,152,953 | 5/1979 | Headley | 74/569 |
| 5,345,898 | 9/1994 | Krebs | 123/90.6 |
| 5,361,733 | 11/1994 | Spath et al. | 123/90.16 |
| 5,431,133 | 7/1995 | Spath et al. | 123/90.5 |
| 5,454,353 | 10/1995 | Elendt et al. | 123/90.5 |

*Primary Examiner*—Weilun Lo
*Attorney, Agent, or Firm*—Karl F. Barr, Jr.

[57] ABSTRACT

A valve actuation assembly is disclosed for use on an internal combustion engine. The assembly includes a cam follower having a follower body. The follower body has an upper head portion and is configured to receive a pair of spaced rollers therein. The rollers are mounted on shafts in the follower body and extend outwardly from the head portion to engage corresponding spaced cam surfaces of a rotatable camshaft for actuating the valve lifter and, consequently, an associated engine valve. The head portion of the follower body cooperates with the inner sidewalls of the rollers to define a space therebetween for straddling a radially outwardly extending spacer mounted for rotation on the camshaft between the spaced cam surfaces. The side surfaces of the outwardly extending spacer are operable with corresponding sidewalls of the rollers to prevent rotation of the cam follower relative to the camshaft.

3 Claims, 1 Drawing Sheet

VALVE ACTUATION ASSEMBLY

TECHNICAL FIELD

The invention relates to valve lifters for an internal combustion engine.

BACKGROUND

U.S. Pat. No. 4,152,953 issued in the name of Headley discloses a roller valve lifter having a roller and shaft assembly received in the open, bottom end of the lifter body. The roller assembly includes an anti-rotation plate which engages a slot in the cam face to prevent rotation of the follower, relative to the surface of the cam, during operation. The design, while effective, requires that the lifter carry the anti-rotation assembly as part of the roller and shaft, significantly increasing the reciprocating mass of the follower.

U.S. Pat. No. 5,361,733 issued in the name of Spath et al, discloses a roller hydraulic valve lifter (RHVL) having dual roller shaft assemblies. Rotation of the valve lifter is prevented through an extended roller shaft which engages a slot in the engine head bore in which the lifter is disposed. The slot requires modification of the engine head for application of the lifter.

SUMMARY OF THE INVENTION

In a preferred embodiment of the invention, an internal combustion engine includes a head component supporting a camshaft, and a plurality of direct acting hydraulic valve lifters. The camshaft carries sets of spaced cams which act on corresponding pairs of spaced rollers mounted on shafts within the valve lifter bodies. Between each set of spaced cams the camshaft carries an anti-rotation spacer. The spacer profile mirrors that of the adjacent cam profiles with a radial dimension exceeding that of the cams. As such, the spacer extends between the spaced rollers of the follower to prevent rotation of the follower with respect to the cam surfaces.

Placement of the anti-rotation spacer on the camshaft as disclosed herein provides a compact and efficient design, having a minimum of reciprocating mass. The disclosed valve lifter is for use in many overhead cam direct acting valve gear applications and does not require changes to the engine head to provide for anti-rotation mechanisms.

The present invention will now be described, by way of example, with reference to the accompanying drawings.

BRIEF DRAWING DESCRIPTION

DETAILED DESCRIPTION OF THE PREFERRED EMBODIMENT

Figure 1:
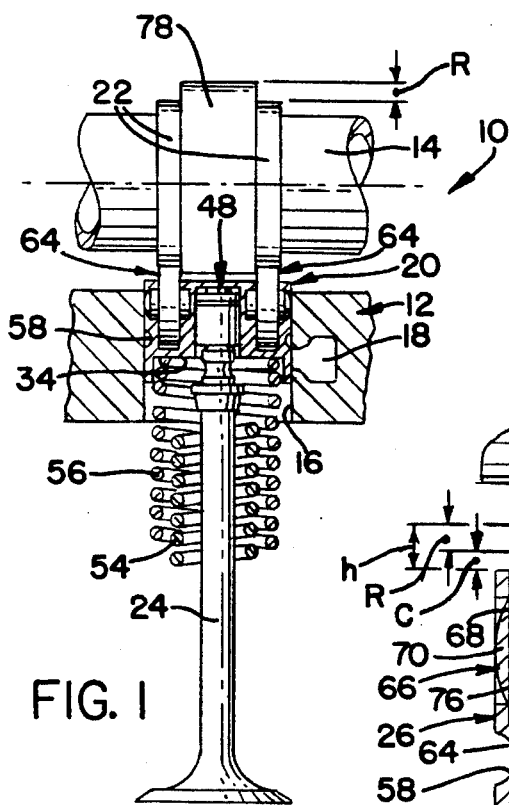
FIG. 1 is a partially schematic cross sectional view of an engine having a valve actuation assembly according to the present invention.

Referring now to FIG. 1 of the drawings, an engine 10 includes a head and/or carrier component 12 supporting a camshaft 14 and having a sleeve or bore 16 in communication with an oil gallery 18 to thereby receive a plurality of roller direct acting hydraulic valve lifters 20, only one of which is shown. The camshaft includes a pair of spaced cams 22 for each of the inlet valves and/or exhaust valves 24 of the engine. The cams 22 are configured to actuate the valves 24 over at least a portion of the lift curve of each valve.

Figure 2:
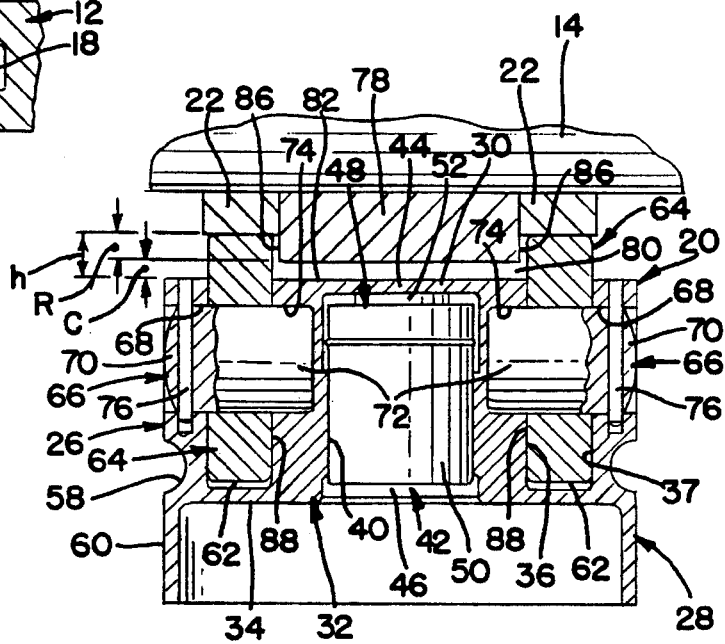
FIG. 2 is a side view of the valve actuation assembly of FIG. 1.

The roller lifter 20, FIG. 2, includes an annular follower body 26 having a cylindrical outer skirt 28, depending from an upper portion or head 30, that is reciprocable in bore 16 in the engine cam carrier 12. The head 30 also includes an inner cylindrical surface or skirt 32 spaced concentrically within the outer skirt 28 and terminating in a radially extending shoulder 34. The inner skirt 32 includes an outer surface 36 which faces the inner surface 37 of the outer skirt 28, and an inner surface 40 which defines a hollow cylinder 42 having a closed end 44 and an open end 46.

Within the hollow cylinder 42 there is received a hydraulic lash adjuster or hydraulic element assembly (HEA) 48. This HEA may include a hollow piston 50 internally carrying a plunger 52 and other elements similar to conventional HEA's.

The piston 50 of the HEA 48 may directly engage the stem of engine valve 24 for actuating it in an open direction. A valve spring 54 acting against the valve 24 and a fixed valve seat, not shown, in the engine 10 biases the valve 24 towards a closed direction. A concentric outer spring 56, acting between the shoulder 34 and a fixed seat, not shown, similarly biases the lifter 20 against the cams 22.

An annular or arcuate groove 58 extending about the outer surface 60 of the skirt 28 of follower body 26, receives oil from a gallery 18 in the carrier component 12 and delivers it, through an oil passage (not shown) to the interior of the HEA 48.

Between the inner and outer surfaces 37,36 of the cylinders 28,32 are defined laterally spaced recesses or pockets 62 in which rollers 64 are located. The rollers 64 extend axially above or beyond the outer surface of the head 30 to engage the spaced apart cams 22 and are thereby effective to reduce the friction of the valve mechanism during operation. Transverse openings 68 in the outer skirt 28 receive the outer ends 70 of the roller shafts 66 while the inner ends 72 of the shafts may be supported in openings 74 in the inner cylindrical skirt 32. The outer ends 70 of the shafts 66 are located with a pin 76 or may be otherwise fixed in position through the use of another suitable method such as staking or with an interference fit between the shaft end 70 and the opening 68.

Figure 3:
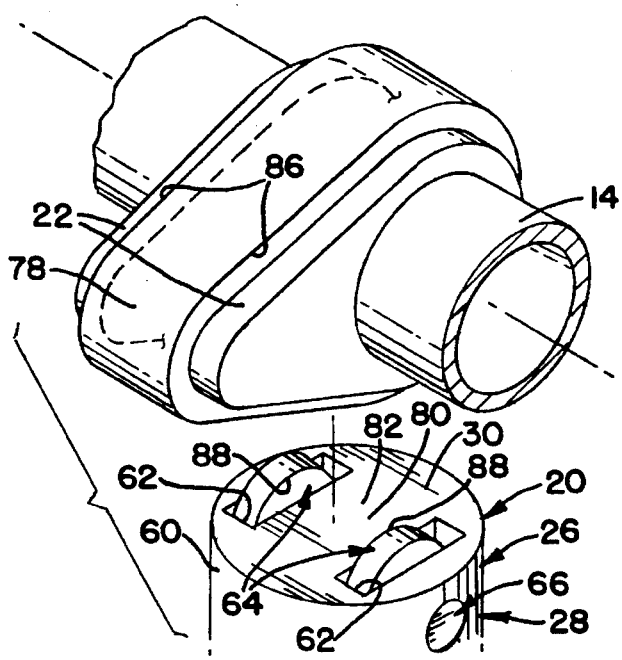
FIG. 3 is an isometric view of portions of the valve actuation assembly of FIG. 1.

Referring now to the camshaft 14, FIGS. 2 and 3, a radially outwardly extending anti-rotation spacer 78 is disposed between the spaced cams 22. The anti-rotation spacer has a profile that mirrors the cam profile but with a radial height "R" greater than that of the cams. As a consequence, the spacer 78 rotates within a space 80 defined by the rollers 64 and the outer surface of the valve lifter head 30. In order to prevent contact between the spacer 78 and the upper surface 82 of the head 30 during camshaft rotation, the radial height "R" of the anti-rotation spacer above the spaced cams 22 is less than the roller height "h" above the upper surface 82 of the head 30 thereby defining a clearance "C" between the spacer 78 and the head 30 within space 80.

In operation, camshaft rotation causes the spaced cams 22 to actuate the rollers 64 thereby moving the valve lifter 20 and the valve 24 in a preset lift curve. As the cams 22 contact the rollers 64, the anti-rotation spacer 78 rotates within the space 80 between the rollers 64. Valve lifter rotation which will cause the rollers 64 to skew relative to the spaced cams 22 is prevented by contact between the spacer side surfaces 86 and the inner sidewalls 88 of the rollers 64 which operate to maintain the rollers in alignment with the cams 22.

While the camshaft 14, related cams 22 and spacer 78 may be constructed of any suitable method known in the art for manufacture of such camshafts, the present invention is especially well suited for applicability to fabricated camshafts. In addition, the use of a fabricated method for constructing the camshaft of the present invention allows the use of differing materials for the spaced cams 22 and the anti-rotation spacer 78. It may be desirable to utilize a polymeric material having high lubricity in the anti-rotation spacer which will minimize the frictional losses from contact with the roller sidewalls.

I claim:

1. A valve actuation assembly comprising a cam follower including a follower body configured to receive first and second spaced rollers therein, said rollers operable to engage corresponding spaced cam surfaces of a rotatable camshaft for actuation of said valve lifter and to define a space therebetween for straddling a radially outwardly extending spacer mounted on said camshaft and rotatable therewith, said spacer having side surfaces operable to engage sidewalls of said rollers to thereby prevent rotation of said valve lifter.

2. A valve actuation assembly comprising a cam follower including a follower body having a head portion and configured to receive first and second spaced rollers therein, said rollers extending from said head portion and operable to engage corresponding spaced cam surfaces of a rotatable camshaft for actuation of said valve lifter, said head portion and said rollers defining a space for straddling a radially outwardly extending spacer mounted on said camshaft between said spaced cam surfaces and rotatable therewith in said space, said spacer having side surfaces operable with sidewalls of said rollers to thereby prevent rotation of said valve lifter relative to said camshaft.

3. A valve actuation assembly comprising a cam follower including a follower body having a ahead portion and configured to receive first and second spaced rollers therein, said rollers extending from said head portion and operable to engage corresponding spaced cam surfaces having a first cam profile, of a rotatable camshaft for actuation of said valve lifter, said head portion and said rollers defining a space for straddling a radially outwardly extending spacer, having a second cam profile, mounted on said camshaft between said spaced cam surfaces and rotatable therewith in said space, said spacer having side surfaces operable with sidewalls of said rollers to thereby prevent rotation of said valve lifter relative to said camshaft.

\* \* \* \* \*